United States Patent
Bryson et al.

(10) Patent No.: US 10,571,365 B2
(45) Date of Patent: Feb. 25, 2020

(54) AUTOMATIC TESTING OF OVERLOAD PROTECTION DEVICE IN A RESCUE HOIST

(71) Applicant: Goodrich Corporation, Charlotte, NC (US)

(72) Inventors: Richard Bryson, Yorba Linda, CA (US); Christopher Wilson, Wake Forest, NC (US)

(73) Assignee: Goodrich Corporation, Charlotte, NC (US)

( * ) Notice: Subject to any disclaimer, the term of this patent is extended or adjusted under 35 U.S.C. 154(b) by 203 days.

(21) Appl. No.: 15/910,814

(22) Filed: Mar. 2, 2018

(65) Prior Publication Data

US 2018/0252616 A1    Sep. 6, 2018

Related U.S. Application Data

(60) Provisional application No. 62/466,907, filed on Mar. 3, 2017.

(51) Int. Cl.

| | |
|---|---|
| *G07C 3/00* | (2006.01) |
| *G01M 13/022* | (2019.01) |
| *G01M 13/028* | (2019.01) |
| *B66D 1/58* | (2006.01) |
| *B66D 1/14* | (2006.01) |
| *B66D 1/54* | (2006.01) |

(Continued)

(52) U.S. Cl.
CPC .............. *G01M 13/022* (2013.01); *B66D 1/14* (2013.01); *B66D 1/485* (2013.01); *B66D 1/54* (2013.01); *B66D 1/58* (2013.01); *B66D 3/20* (2013.01); *G01M 13/028* (2013.01); *G07C 3/00* (2013.01); *F16D 7/025* (2013.01); *F16D 2300/18* (2013.01)

(58) Field of Classification Search
CPC .......... G01M 13/22; B66D 1/14; B66D 1/54; B66D 1/58; G07C 3/00
See application file for complete search history.

(56) References Cited

U.S. PATENT DOCUMENTS

| | | |
|---|---|---|
| 4,475,163 A | 10/1984 | Chandler et al. |
| 4,605,107 A | 8/1986 | Hallidy et al. |
| (Continued) | | |

FOREIGN PATENT DOCUMENTS

| | | |
|---|---|---|
| EP | 2492661 A1 | 8/2012 |
| JP | 2005214284 A | 8/2005 |

OTHER PUBLICATIONS

European Search Report for Application No. 18159792.3, dated Jul. 31, 2018, 6 pages.

*Primary Examiner* — Jamel E Williams
(74) *Attorney, Agent, or Firm* — Kinney & Lange, P.A.

(57) ABSTRACT

An automatic field load check testing system includes a computer communicating with and commanding a rescue hoist. A processor of the computer commands the rescue hoist to wind to build a load on a cable. As the tension builds a sensor monitors an overload clutch to determine if any friction discs in the overload clutch slip as the load builds. When the load reaches a minimum clutch slip load, the load is relieved. Where the friction discs slip before the load reaches the minimum clutch slip load, the overload clutch fails the test. Where the friction discs do not slip before the load reaches the minimum clutch slip load, the overload clutch passes the test.

20 Claims, 4 Drawing Sheets

(51) Int. Cl.
*B66D 1/48* (2006.01)
*B66D 3/20* (2006.01)
*F16D 7/02* (2006.01)

(56) References Cited

U.S. PATENT DOCUMENTS 4,636,962 A 1/1987 Broyden et al.
2019/0308853 A1* 10/2019 Bryson .................. B66D 1/485

* cited by examiner

AUTOMATIC TESTING OF OVERLOAD PROTECTION DEVICE IN A RESCUE HOIST

CROSS-REFERENCE TO RELATED APPLICATION(S)

This application claims the benefit of U.S. Provisional Application No. 62/466,907 filed Mar. 3, 2017 for "AUTOMATIC TESTING OF OVERLOAD PROTECTION DEVICE IN A RESCUE HOIST".

BACKGROUND

This disclosure relates generally to rescue hoists. More particularly, this disclosure relates to automatic testing of overload protection in rescue hoists.

Rescue hoists deploy and retrieve a cable from a cable drum to hoist persons or cargo. A motor and gear train cause the cable drum to rotate and to thus deploy or retrieve the cable. The gear train typically includes an overload clutch. The overload clutch provides overload protection to the rescue hoist, as the friction discs of the overload clutch are configured to slip at a predetermined load, which is typically about twice the rated capacity of the rescue hoist. The friction discs slipping disconnects the cable drum from other components of the drive train and from the motor, thereby allowing the cable drum to rotate and unspool the cable in response to the overload event. The overload clutch thus provides overload protection to the rescue hoist and to the object carrying the rescue hoist, such as a helicopter or other aircraft.

SUMMARY

According to one aspect of the disclosure, a method of testing an overload clutch includes activating, with a processor of a computer, a motor of a hoist, the motor driving a cable drum through an overload clutch, loading the cable to a minimum clutch slip load with the motor, sensing a load on the cable and communicating the load to the processor, and monitoring an overload clutch with a sensor, the sensor configured to sense slippage of a friction disc of the overload clutch and to generate a slip signal in response to slippage of the friction disc.

According to another aspect of the disclosure, a method of initializing a hoist includes determining, with a processor of a computer, a status of at least one pre-test factor of a hoist, and conducting at field load check test of an overload clutch of the hoist based on each of the at least one pre-test factor being true, the field load check test including at least one loading iteration. The at least one loading iteration includes activating, with the processor of the computer, a motor of the hoist, the motor driving a cable drum through the overload clutch, loading the cable to a minimum clutch slip load with the motor, sensing a load on the cable and communicating the load to the processor, and monitoring an overload clutch with a sensor, the sensor configured to sense slippage of a friction disc of the overload clutch and to generate a slip signal in response to slippage of the friction disc.

DETAILED DESCRIPTION

Figure 1A:
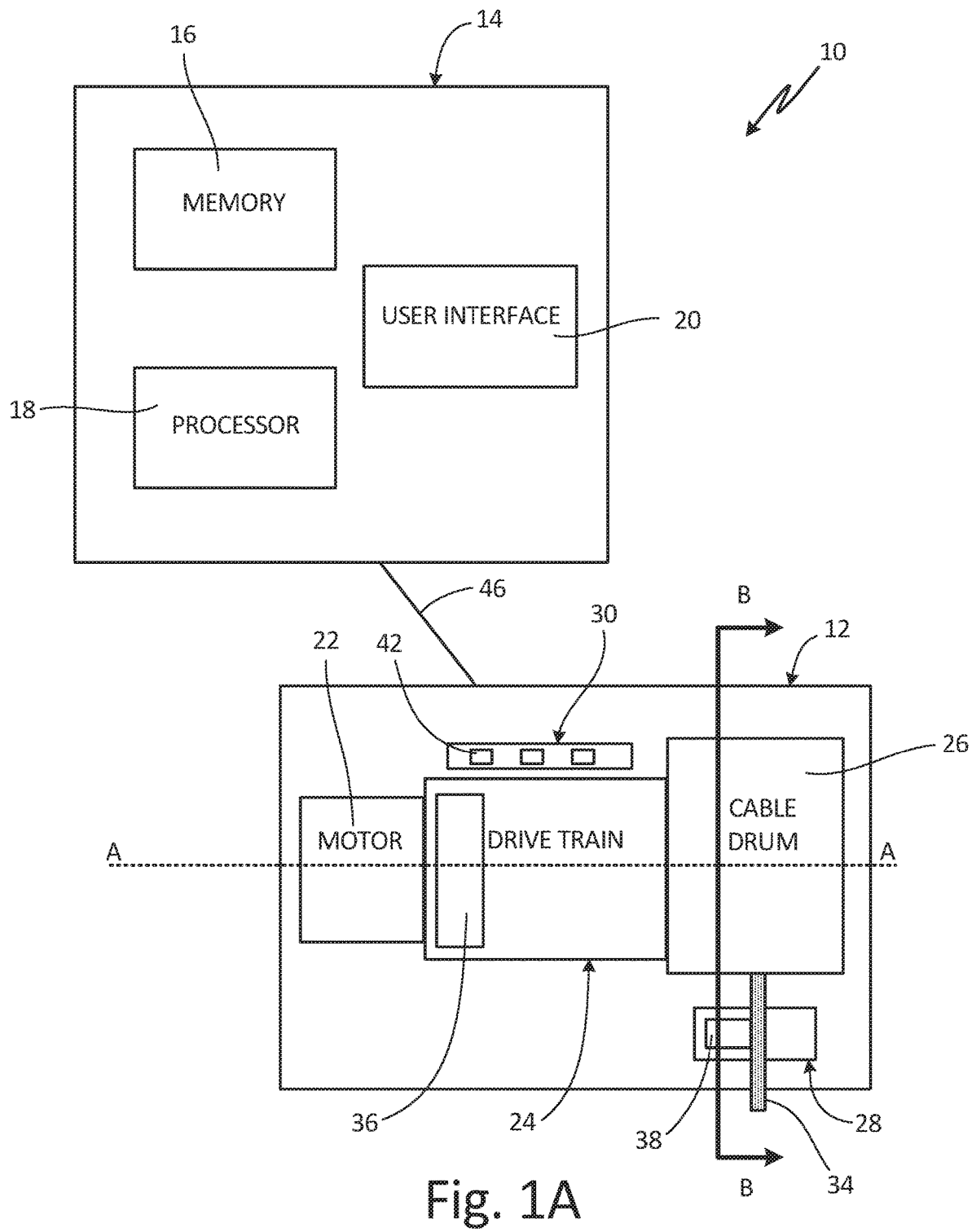
FIG. 1A is a schematic diagram of a rescue hoist and monitoring system.
Figure 1B:
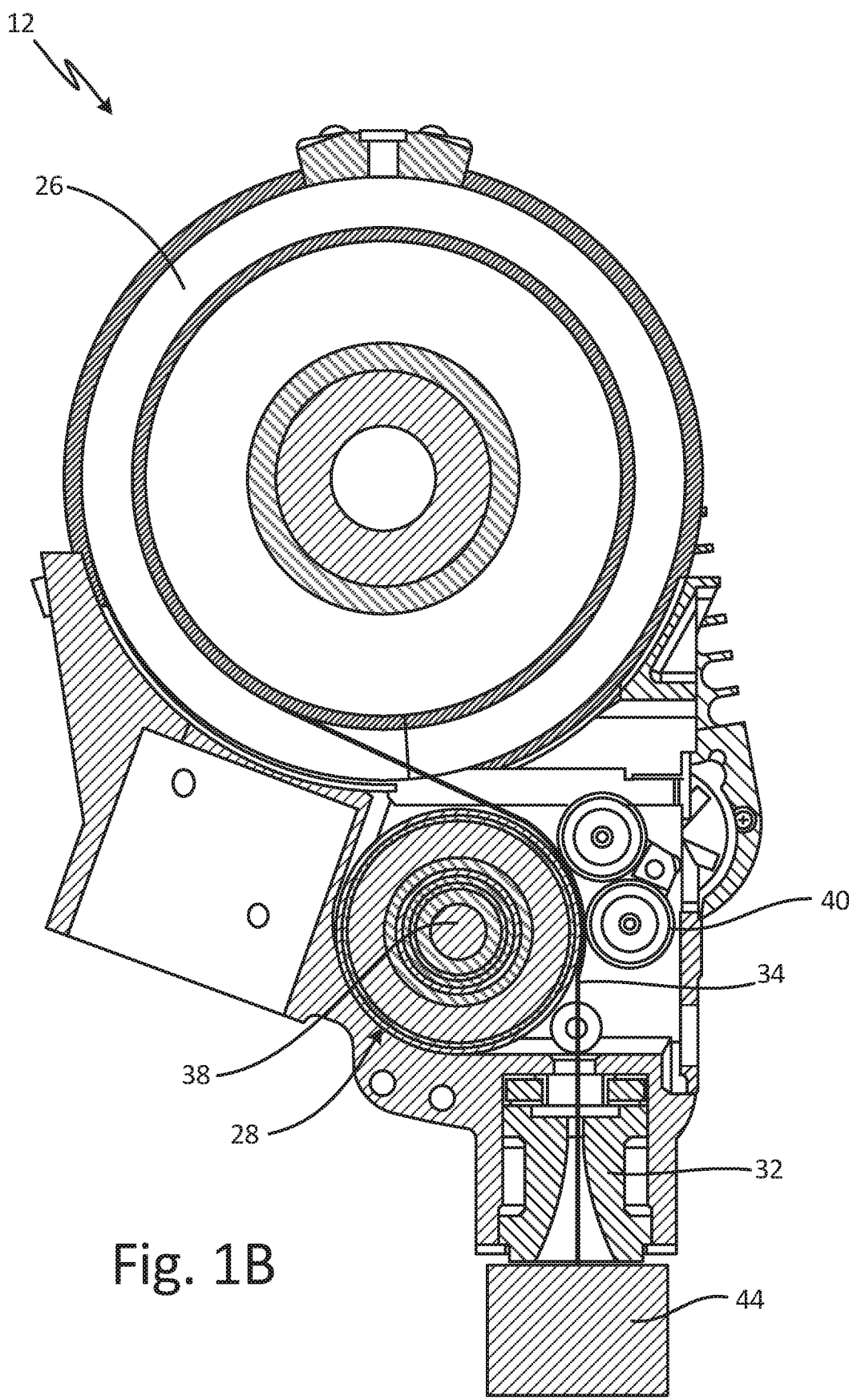
FIG. 1B is a side cross-sectional view of a rescue hoist taken along line B-B in FIG. 1A.

FIG. 1A is a block diagram of system 10 for monitoring and testing rescue hoist 12. FIG. 1B is a side cross-sectional view of rescue hoist 12 taken along line B-B in FIG. 1A. FIGS. 1A and 1B will be discussed together. System 10 includes computer 14, and computer 14 includes memory 16, processor 18, and user interface 20. Rescue hoist 12 includes motor 22, drive train 24, cable drum 26, traction sheave 28, sensors 30, cable guide 32, and cable 34. Drive train 24 includes overload clutch 36. Traction sheave 28 includes load cell 38 and pressure rollers 40. Sensors 30 include slip sensor 42. Cable 34 includes bumper 44.

Computer 14 communicates with rescue hoist 12 via communication link 46. Communication link 46 can be a wired or wireless connection. Processor 18, in one example, is configured to implement functionality and/or process instructions. For instance, processor 18 can be capable of processing instructions stored in memory 16. Examples of processor 18 can include any one or more of a microprocessor, a controller, a digital signal processor (DSP), an application specific integrated circuit (ASIC), a field-programmable gate array (FPGA), or other equivalent discrete or integrated logic circuitry.

Memory 16, in some examples, can be configured to store information during operation. Memory 16, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 16 is a temporary memory, meaning that a primary purpose of memory 16 is not long-term storage. Memory 16, in some examples, is described as volatile memory, meaning that memory 16 does not maintain stored contents when power is turned off. Examples of volatile memories can include random access memories (RAM), dynamic random access memories (DRAM), static random access memories (SRAM), and other forms of volatile memories. In some examples, memory 16 is used to store program instructions for execution by processor 18. Memory 16, in one example, is used by software or applications running on computer 14 to temporarily store information during program execution.

Memory 16, in some examples, also includes one or more computer-readable storage media. Memory 16 can be configured to store larger amounts of information than volatile memory. Memory 16 can further be configured for long-term storage of information. In some examples, memory 16 includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 20, such as a keyboard, touchscreen, monitor, mouse, or other suitable interface device, allows a user to interact with system 10, such as by retrieving information from memory 16, receiving notifications, initiating the software stored in memory 16, and inputting additional information to memory 16, among other examples.

Rescue hoist 12 is configured to deploy and retrieve cable 34 to raise objects to and lower objects from rescue hoist 12. Cable drum 26 of rescue hoist 12 rotates about cable drum axis A-A to deploy and retrieve cable 34. Motor 22 is connected to and provides rotational power to rescue hoist 12 through drive train 24. Drive train 24 is connected, either directly or indirectly, such as through an intermediate linear bearing, to cable drum 26 and drives cable drum 26 about cable drum axis A-A. Cable 34 is wound about cable drum 26, extends through traction sheave 28, and exits rescue hoist 12 through cable guide 32. Bumper 44 is disposed at an end of cable 34 and abuts cable guide 32 with cable 34 fully retracted.

Traction sheave 28 creates and maintains a back tension on cable 34 between traction sheave 28 and cable drum 26. Pressure rollers 40 force cable 34 against traction sheave 28 to ensure that cable 34 maintains a connection with traction sheave 28. Traction sheave 28 maintaining the back tension in cable 34 ensures a discrete winding of cable 34 onto cable drum 26, as any slackness of cable 34 between traction sheave 28 and cable drum 26 can cause miswinding of cable 34 on cable drum 26, can lead to cable 34 jamming, and/or can lead to possible breakage of cable 34. Load cell 38 is disposed in traction sheave 28 and is configured to sense a load on cable 34 as cable 34 passes through traction sheave 28.

Overload clutch 36 is a component of drive train 24 and transmits power within drive train 24. Overload clutch 36 includes a disc pack having friction discs, which are configured to slip relative to each other when a load on cable 34 exceeds a minimum clutch slip load. The slippage of the friction discs disconnects cable drum 26 from motor 22 and other components within drive train 24 that resist movement of cable drum 26, thereby allowing cable drum 26 to rotate and unspool cable 34 in response to the overload condition. Overload clutch 36 disconnecting cable drum 26 from motor 22 prevents the load from damaging rescue hoist 12 because cable 34 is able to unspool in response to the overload event. In some embodiments, the clutch slip load is about twice the rated load of rescue hoist 12. For example, where rescue hoist 12 has a rated load of about 273 kg (600 lb.), the clutch slip load will be about 544 kg (1200 lb.). As such, overload clutch 36 will slip to allow cable 34 to unspool during an overload event. Overload clutch 36 thus provides overload protection to rescue hoist 12. It is understood, however, that other overload definitions and specifications are possible in other embodiments.

Sensors 30 are disposed in rescue hoist 12 and configured to sense various conditions of cable 34. In some embodiments, sensors 30 can sense a rotation of cable drum 26 and a length of cable 34 deployed, for example. Slip sensor 42 is configured to sense when the friction discs of overload clutch 36 slip, and to produce a slip signal in response to detecting slippage of the friction discs. Slip sensor 42 provides the slip signal to computer 14 via communication link 46. It is understood that slip sensor 42 can be any suitable device for sensing the slippage of the friction discs. In one embodiment, slip sensor 42 is a vibration sensor configured to sense a vibration profile created by the friction discs slipping relative to each other. In another embodiment, slip sensor 42 counts the gear rotation on the input end and the output end of overload clutch 36.

To ensure that overload clutch 36 provides the desired overload protection, overload clutch 36 is subjected to a field load check test (FLCT). During an FLCT, cable 34 is loaded to the minimum clutch slip load, which is the smallest load that should cause any slippage in the friction discs of overload clutch 36, and slip sensor 42 monitors overload clutch 36 to determine if overload clutch 36 slips. If overload clutch 36 slips, then overload clutch 36 fails the FLCT. If overload clutch 36 does not slip, then overload clutch 36 passes the FLCT.

Memory 16 stores software that, when executed by processor 18, initiates and runs an automatic FLCT on overload clutch 36. Memory 16 also stores various historical parameters associated with rescue hoist 12. For example, computer 14 can receive and memory 16 can store information from sensors 30 such as the length cable 34 deployed at any time, the load on cable 34, or any other desired information regarding the conditions of cable 34. The information regarding the condition of cable 34 can be stored in memory 16 for reference and for use in later monitoring and testing of rescue hoist 12. Before running an automatic FLCT, processor 18 should determine the status of two pre-test factors. If both pre-test factors are true, then computer 14 proceeds with the FLCT. If either pre-test factor is false, then computer 14 can provide an indication, via user interface 20, as to which pre-test factor is false. While the FLCT is described as including two pre-test factors, it is understood that the FLCT can include more or fewer than two pre-test factors.

The first pre-test factor can be a temporal pre-test factor. An FLCT is run periodically to ensure that overload clutch 36 is functioning properly. A test interval, which may be pre-stored in memory 16 and recalled by processor 18 when rescue hoist 12 is activated, is the period between FLCTs. The test interval can be any desired time interval set by the manufacturer, by the user, and by governmental directive or regulation, for example. In one embodiment, the test interval is 24 weeks, but it is understood that the test interval can be greater than or less than 24 weeks. A time interval since most-recent test is also stored in memory 16. Processor 18 compares the time interval since the most-recent test to the test interval. In some embodiments, if the time interval since most-recent test is less than the test interval, then the first pre-test factor is false and the FLCT is not yet required. As such, overload clutch 36 can continue to operate without an FLCT. In some embodiments, if the time interval since most-recent test is within a notification period of the test interval, then the first pre-test factor is true. The notification period can be set as any desired difference between the time interval since the most-recent test and the test interval. For example, where the test interval is 24 weeks, the notification period can be set at 4 weeks, such that the first pre-test factor is true when the time interval since the most-recent test reaches 20 weeks. It is understood, however, that the notification period can be set at any desired period. In other embodiments, if the time interval since most-recent test equals or exceeds the test interval, then the first pre-test factor is true.

The second pre-test factor can be the cable status of cable 34 on cable drum 26. Prior to running the FLCT, cable 34 should be conditioned. To condition cable 34, a conditioning length of cable 34 is deployed from rescue hoist 12 and cable 34 is spooled onto cable drum 26 with a conditioning load on cable 34. In some embodiments, the conditioning length of cable 34 is a full length of cable 34, but it is understood that the conditioning length can vary among rescue hoists. In some embodiments, the minimum conditioning load is about 227 kg (500 lb.). It is understood, however, that the minimum conditioning load can vary among rescue hoists. Conditioning cable 34 ensures a uniform tension on each layer of cable 34 on cable drum 26, thereby preventing the FLCT from indicating a failure due to cable 34 shifting on cable drum 26 even though the friction discs of overload clutch 36 did not slip. Memory 16 stores the cable status from previous deployments of cable 34. For example, memory 16 can store the length of cable 34 deployed and the load on cable 34 as cable 34 is reeled onto cable drum 26. Processor 18 can recall the cable status from memory 16 to determine if the cable 34 is properly conditioned. If the cable status indicates that cable 34 is properly conditioned, then the second pre-test factor is true. If the cable status indicates that cable 34 is not properly conditioned, then the second pre-test factor is false and computer 14 can indicate to the user, via user interface 20, for example, that cable 34 should be conditioned before proceeding with the FLCT. In some embodiments where the FLCT includes a single pre-test factor, the cable status of cable 34 on cable drum 26 is the single pre-test factor.

During the FLCT, cable 34 is loaded to the minimum clutch slip load and overload clutch 36 is monitored for any slippage. In some embodiments, the minimum clutch slip load is about twice the rated capacity of rescue hoist 12. In some embodiments, the test load can be any desired load set by the manufacturer, and by governmental directive or regulation, for example. In some embodiments, the FLCT includes a single loading iteration. In other embodiments, the FLCT includes multiple loading iterations.

Computer 14 initiates each loading iteration of the FLCT. During each loading iteration, the load on cable 34 is increased to the minimum clutch slip point. Slip sensor 42 monitors overload clutch 36 as cable 34 is loaded to detect any slippage within overload clutch 36. Processor 18 instructs motor 22 to wind cable drum 26 to create tension in cable 34. The tension in cable 34 is created by winding cable 34 with bumper 44 abutting cable guide 32. The tension develops in the portion of cable extending over traction sheave 28 between cable drum 26 and cable bumper 44. Load cell 38 senses the load on traction sheave 28 and communicates the load information to computer 14 via communication link 46. The load on cable 34 builds until load cell 38 indicates that the load has reached the minimum clutch slip load. When the load reaches the minimum clutch slip load, processor 18 instructs motor 22 to reverse to thereby relieve the tension on cable 34. With the tension relieved, a single loading iteration is complete.

Slip sensor 42 monitors overload clutch 36 to detect any slippage of the friction discs of overload clutch 36. Slip sensor 42 communicates the occurrence of a slip to processor 18 via communication link 46, and the slip information can be stored in memory 16. If slip sensor 42 senses that the friction discs of overload clutch 36 slip before the load reaches the minimum clutch slip load during any loading iteration, then overload clutch 36 failed the FLCT. If slip sensor 42 does not sense that the friction discs of overload clutch 36 slipped during any loading iteration of the FLCT, then overload clutch 36 passed the FLCT. A failure indicates that overload clutch 36 should be removed from service and repaired.

System 10 proceeds through a minimum number of loading iterations before overload clutch 36 is considered to have passed the FLCT. A minimum iteration count, which is the minimum number of loading iterations for a pass, can be stored in memory 16. After each successful loading iteration, the processor 18 generates a successful iteration count, which is a count of the number of loading iterations successfully completed during the current FLCT. Processor 18 compares the successful iteration count to the minimum iteration count to determine whether additional loading iterations are required. If the successful iteration count is less than the minimum iteration count, processor 18 proceeds through another loading iteration. If the successful iteration count equals the minimum iteration count, processor 18 records the FLCT as a pass and exits the FLCT.

In one embodiment, the minimum iteration count is one. In some embodiments, the minimum iteration count is more than one. By way of example, an FLCT having a minimum iteration count of three is discussed below.

Processor 18 initially determines the status of the two pre-test factors. If both pre-test factors are true, then processor 18 proceeds to the loading iterations of the FLCT. In some embodiments, each loading iteration is identical, such that the load applied to cable 34, and thus to overload clutch 36, is the same for each loading iteration. During the first iteration of the FLCT, motor 22 increases a tension on cable 34 by winding cable drum 26 with bumper 44 abutting cable guide 32. Motor 22 increases the load on cable 34 until load cell 38 indicates to processor 18 that the minimum clutch slip load has been reached. Motor 22 then reverses to relieve the tension on cable 34. During the loading of cable 34, slip sensor 42 monitors overload clutch 36 to determine if any slippage occurs in overload clutch 36. If slip sensor 42 did not sense any slippage in overload clutch 36, then a first successful iteration is recorded in memory 16. If slip sensor 42 does sense slippage in overload clutch 36, then processor 18 records the load during the slip and a test fail is recorded in memory 16. The test fail can be indicated to the user via user interface 20. In some embodiments, processor 18 exits the FLCT when overload clutch 36 slips. In some embodiments, processor 18 continues through the remaining loading iterations after recording the slip to gather additional diagnostic data regarding rescue hoist 12. During the second loading iteration of the FLCT, motor 22 increases the tension on cable 34 until load cell 38 indicates that the minimum clutch slip load has been reached, then motor 22 releases the tension on cable 34. If slip sensor 42 did not sense any slippage of friction discs, then system 10 records a successful loading iteration in memory 16. System 10 continues through subsequent loading iterations until the successful iteration count reaches the minimum iteration count. If slip sensor 42 did not sense any slippage of friction discs during any loading iteration, then system 10 records the successful completion of the minimum number of loading iterations as a "pass" of the FLCT. While processor 18 is described as exiting the FLCT in response to any slippage, it is understood that processor 18 can continue the FLCT and compute an average load at which overload clutch 36 slipped for each loading iteration across the full number of loading iterations. In some embodiments, for example, overload clutch 36 passes the FLCT even where overload clutch 36 slipped during a loading iteration, provided that the slip occurs within a suitable margin of error of the minimum clutch slip load. Where the average load across all loading iterations is utilized, it is understood that the successful iteration count can be a completed iteration count, which does not depend on overload clutch 36 passing each iteration. In some embodiments, additional parameters such as vibration and/or temperature can be recorded in memory 16 to facilitate system diagnostics.

As such, system 10 automatically proceeds through the overall FLCT and through each loading iteration of the FLCT. System 10 provides significant advantages. Automatically tensioning cable 34 and sensing the load on cable 34 with load cell 38 minimizes any error in the FLCT. In addition, the time devoted to conducting the FLCT is minimized by processor 18 initiating and running the FLCT, by having motor 22 tension cable 34, and by recording test results in memory 16. Tensioning cable 34 with motor 22 eliminates additional tools that were previously required to tension cable 34 and eliminates the process of attaching cable 34 to those tools. Moreover, load cell 38 provides an accurate measurement of the load on cable 34 at any time, increasing the reliability and accuracy of the FLCT. Monitoring the FLCT and recording the FLCT results with computer 14 streamlines the FLCT and eliminates the need for a user to conduct each step of the FLCT. Furthermore, the automatic FLCT provides greater confidence in overload clutch 36 by eliminating user error from the FLCT.

Figure 2:
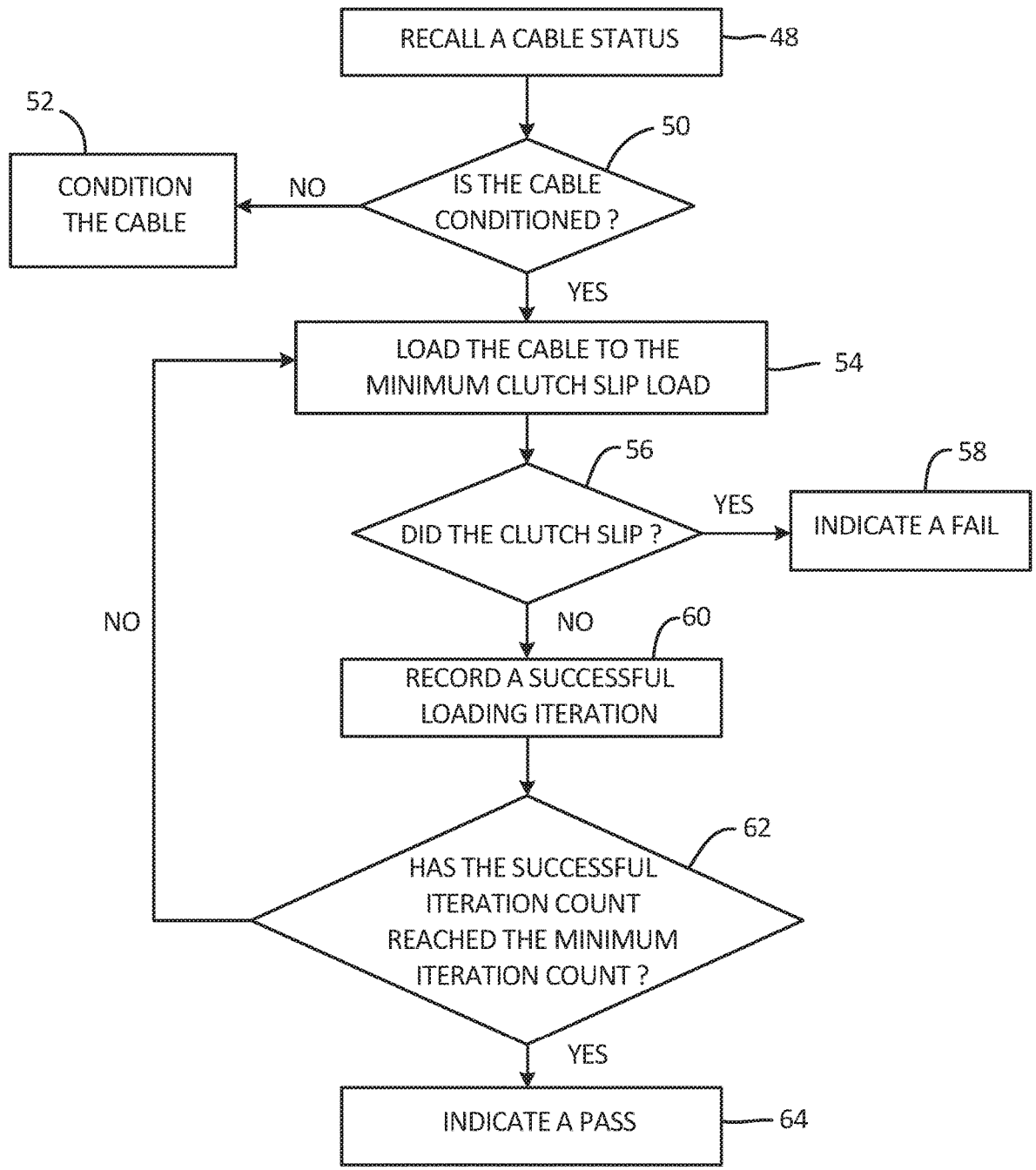
FIG. 2 is a flow diagram of an automatic field load check test.

FIG. 2 is a flow diagram of a process of an automatic field load check test of an overload clutch. In step 48, a processor, such as processor 18 (FIG. 1A), recalls cable status information from a memory, such as memory 16 (FIG. 1A). At step 50, the processor determines if a cable, such as cable 34 (FIGS. 1A and 1B), is properly conditioned for the FLCT. For example, information from the most-recent cable deployment, such as the length of the cable deployed and the load on the cable can be stored in the memory and recalled by the processor. If the answer is NO, then the cable is not properly conditioned for the FLCT and the process proceeds to step 52. At step 52, the cable is conditioned by deploying the cable to a conditioning length and reeling the cable onto a cable drum, such as cable drum 26 (FIGS. 1A and 1B), with a conditioning load on the cable. The process then proceeds back to step 48. If the answer is YES, then the process proceeds to step 54.

In step 54, the cable is loaded to the minimum clutch slip load. The processor instructs a motor, such as motor 22 (FIG. 1A), to activate. The motor drives the cable drum to wind the cable onto the cable drum, thereby creating tension in the cable. The tension in the cable is created by winding the cable until a cable bumper or hook, such as bumper 44 (FIG. 1B), abuts a cable guide, such as cable guide 32 (FIG. 1B), where the cable exits the hoist. The motor continues to wind the cable drum with the cable bumper or hook cable guide to build the load in the cable. A load sensor, such as load cell 38 (FIGS. 1A and 1B), senses the load on the portion of the cable between the hoist exit point and the cable drum. For example, the load sensor can be disposed in a traction sheave, such as traction sheave 28 (FIGS. 1A and 1B), and can be configured to sense the load applied to the traction sheave by the cable. The load sensor communicates the load information to the processor. The load on the cable continues to build until the load reaches the minimum clutch slip load.

In step 56, the processor determines if the overload clutch, such as overload clutch 36 (FIG. 1A) has slipped as the cable was being loaded to the minimum clutch slip load. A sensor, such as slip sensor 42 (FIG. 1A), monitors the overload clutch to determine if the friction discs of the overload clutch slip. The sensor generates a slip signal in response to the friction discs slipping and provides the slip signal to the processor. If the processor receives the slip signal, then the answer in step 56 is YES and the process moves to step 58. If the processor does not receive the slip signal then the answer is NO, then the process moves to step 60.

At step 58, an indication is provided that the overload clutch failed the FLCT, because the friction discs slipped during the loading of the cable. The indication can be provided in any suitable manner, such as via user interface 20 (FIG. 1A). The failure indication signals to the user that the overload clutch requires maintenance or replacement. In addition, the load at which the overload clutch slipped can be recorded in the memory. Recording the load that caused the overload clutch to slip provides useful diagnostic data. In some embodiments, the process proceeds through the remaining number of loading iterations required to reach the minimum iteration count before exiting the FLCT. Even where overload clutch fails each loading iteration, the data gathered throughout the loading iterations provides useful diagnostic information that facilitates easier and quicker maintenance of the hoist.

At step 60, a successful loading iteration is recorded in the memory. Each successful iteration is added together to generate a successful iteration count. The successful iteration count is thus based on the number of loading iterations where the overload clutch does not slip in response to cable 34 being loaded to the minimum clutch slip load. At step 62, the processor compares the successful iteration count to the minimum iteration count, which can be pre-stored in and recalled from the memory, to determine if the overload clutch has passed the minimum number of loading iterations. If the successful iteration count is less than the minimum iteration count the answer is NO, and the process proceeds back to step 54. If the successful iteration count equals the minimum iteration count the answer is YES and the process proceeds to step 64.

At step 64, an indication that the overload clutch passed the FLCT is provided and the processor exits the FLCT. The successful test can be indicated to the user in any suitable manner, such as via user interface 20 (FIG. 1A), for example. The successful test can also be recorded in the memory for further health monitoring of the rescue hoist.

Figure 3:
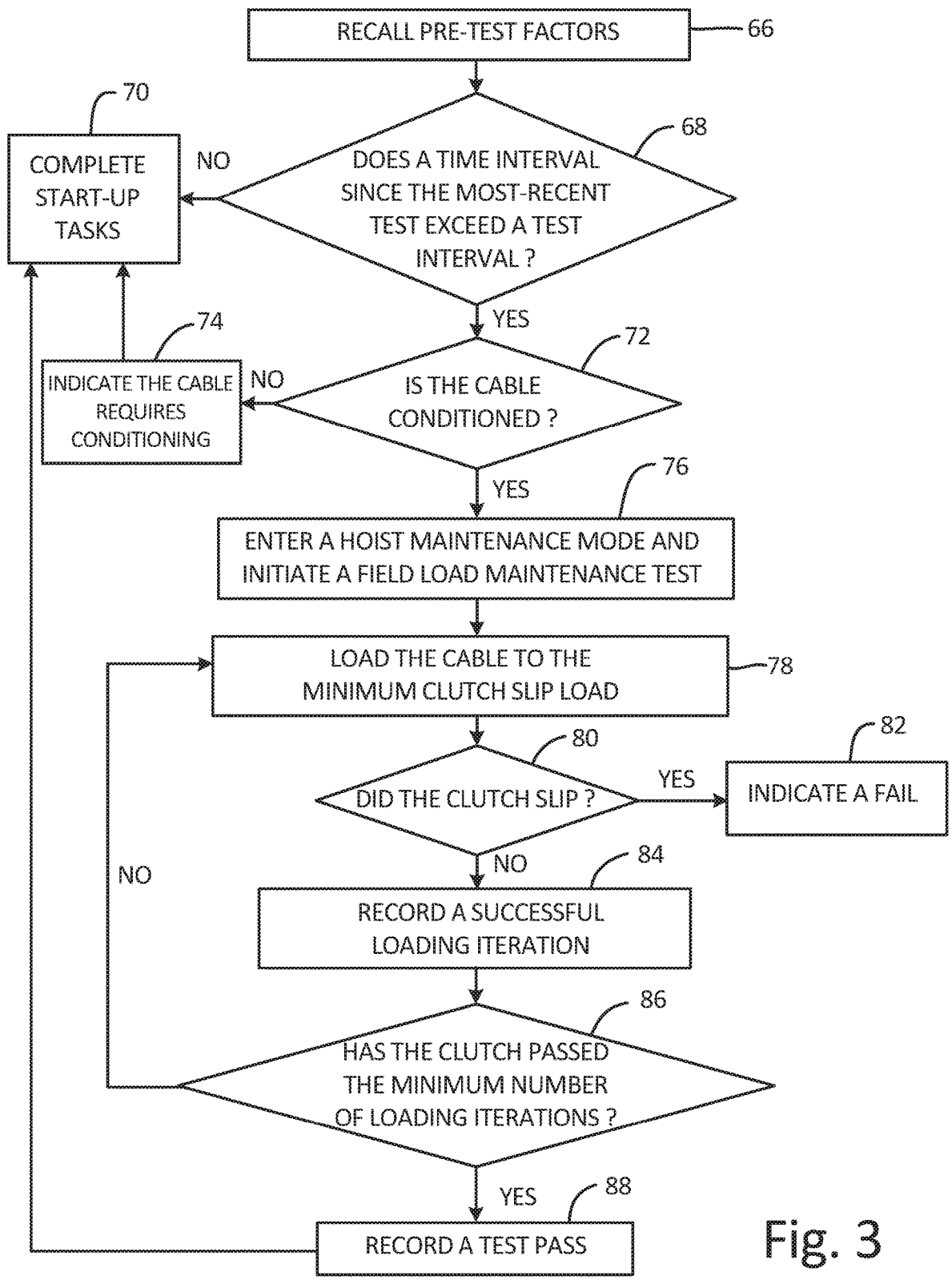
FIG. 3 is a flow diagram of a rescue hoist initialization routine.

FIG. 3 is a flow chart of a process for initializing a rescue hoist for operation. At step 66, the rescue hoist, such as rescue hoist 12 (FIGS. 1A and 1B), is activated, thereby activating a hoist computer, such as computer 14 (FIG. 1A). A processor, such as processor 18 (FIG. 1A), recalls pre-test factor information from a memory, such as memory 16 (FIG. 1A). In step 68, the processor determines if a first pre-test factor is true. The processor recalls a time interval since the most-recent FLCT from the memory and recalls a test interval, which is the set time interval between FLCTs and which can be pre-stored in the memory, from the memory. The processor compares the time interval since most-recent FLCT to the test interval. If the time interval since most-recent FLCT is less than the test interval, then the answer is NO and the first pre-test factor is false. Where the first pre-test factor is false, the process proceeds to step 70. In step 70, any start-up tasks associated with the rescue hoist are completed, and the rescue hoist is ready for operation. If the time interval since most-recent FLCT reaches the test interval or is within a notification period of the test interval, then the answer is YES and the first pre-test factor is true. Where the first pre-test factor is true, the process proceeds to step 72.

At step 72, the processor determines if a cable, such as cable 34 (FIGS. 1A and 1B) is properly conditioned. The cable status is a second pre-test factor, but it is understood that in some embodiments the cable status can be the sole pre-test factor. The processor can recall the cable status information from the memory and can determine if the cable is properly conditioned based on the cable status information. If the answer is NO, then the cable is not properly conditioned for the FLCT and the process proceeds to step 74. If the answer is YES, then the cable is properly conditioned for the FLCT and the process proceeds to step 76.

At step 74, the processor provides an indication that the cable requires conditioning to the user, such as via a user interface, such as user interface 20 (FIG. 1). The user can then schedule cable conditioning during subsequent operation of the rescue hoist, thereby preparing the rescue hoist for an FLCT at the next startup of the rescue hoist. From step 74, the process proceeds to step 70, and any start-up tasks associated with the rescue hoist are completed, thereby readying the rescue hoist for operation.

At step 76, the rescue hoist enters a maintenance mode and the FLCT is initiated. In some embodiments, the rescue hoist is prevented from proceeding through the FLCT unless the rescue hoist is in the maintenance mode. Preventing the FLCT from proceeding unless the rescue hoist is in the maintenance mode ensures that the FLCT occurs when the rescue hoist is not in operation. For example, where the rescue hoist is mounted to an aircraft the FLCT should not occur during flight. In some embodiments, the user causes the rescue hoist to enter the maintenance mode and to proceed with the FLCT, such as by inputting commands with the user interface 20.

At step 78, a load is applied to the cable until the load reaches the minimum clutch slip load. The processor executes the software stored in the memory, and instructs a motor, such as motor 22, to drive a cable drum, such as cable drum 26 (FIGS. 1A and 1B), causing the cable drum to wind the cable inboard until the load on the cable reaches the minimum clutch slip load. A load sensor, such as load cell 38 (FIGS. 1A and 1B), senses the load on the portion of the cable between a cable guide where the cable exits the rescue hoist, such as cable guide 32 (FIG. 1B) and the cable drum. For example, the load sensor can be disposed in a traction sheave, such as traction sheave 28 (shown in FIGS. 1A and 1B), and can be configured to sense the load applied to the traction sheave by the cable. The load sensor communicates the load information to the processor. The load on the cable continues to build until the load reaches the minimum clutch slip load.

At step 80, the processor determines if the overload clutch has slipped. A sensor, such as slip sensor 42 (shown in FIG. 1A), monitors the overload clutch to determine if the friction discs have slipped as the cable was being loaded to the minimum clutch load slip point. If the answer is YES, then the overload clutch has slipped and the process proceeds to step 82. If the answer is NO, then the overload clutch has not slipped during the loading of the cable, indicating that the overload clutch has successfully completed a loading iteration, and the process proceeds to step 86. In some embodiments, the sensor generates a slip signal in response to the overload clutch slipping, and the sensor provides the slip signal to the processor. In those embodiments, the processor receiving the slip signal means that the answer is YES, but the processor not receiving the slip signal means that the answer is NO.

At step 82, an indication is provided that the overload clutch failed the FLCT, because the friction discs slipped during the loading of the cable. The indication can be provided in any suitable manner, such as with the user interface. The failure indication signals to the user that the overload clutch requires maintenance or replacement. In addition, the load at which the overload clutch slipped can be recorded in the memory. Recording the load that caused the overload clutch to slip provides useful diagnostic data. In some embodiments, the process proceeds through the remaining number of loading iterations required to reach the minimum iteration count before exiting the FLCT. Even where overload clutch fails each loading iteration, the data gathered throughout the loading iterations provides useful diagnostic information that facilitates easier and quicker maintenance of the hoist.

At step 84, a successful loading iteration is recorded in the memory. Each successful iteration is added together to generate a successful iteration count. The successful iteration count is thus based on the number of loading iterations where the overload clutch does not slip in response to the cable being loaded to the minimum clutch slip load. At step 86, the processor compares the successful iteration count to the minimum iteration count, which can be pre-stored in and recalled from the memory, to determine if the overload clutch has been subjected to and passed the minimum number of loading iterations. If the successful iteration count is less than the minimum iteration count the answer is NO, and the process proceeds to step 78 and proceeds through additional loading iterations. If the successful iteration count equals the minimum iteration count the answer is YES and the process proceeds to step 88.

In step 88 a successful FLCT is recorded. The successful FLCT can be recorded in the memory. In addition, the successful FLCT causes the time interval since the most-recent FLCT to be reset to a zero count. The process then proceeds back to step 70 and any additional start-up tasks associated with the rescue hoist can be performed. The rescue hoist is thus initialized for operation.

Discussion of Possible Embodiments

The following are non-exclusive descriptions of possible embodiments of the present invention.

A method of testing an overload clutch includes activating, with a processor of a computer, a motor of a hoist, the motor driving a cable drum through an overload clutch, loading the cable to a minimum clutch slip load with the motor, sensing a load on the cable and communicating the load to the processor, and monitoring an overload clutch with a sensor, the sensor configured to sense slippage of a friction disc of the overload clutch and to generate a slip signal in response to slippage of the friction disc.

The method of the preceding paragraph can optionally include, additionally and/or alternatively, any one or more of the following features, configurations and/or additional components:

Recalling, from a memory of the computer, a state of the cable, the state indicating whether the cable is conditioned.

Generating a successful iteration count based on a number of times overload clutch does not slip in response to the cable being loaded to the minimum clutch slip load, and comparing the successful iteration count to a minimum iteration count.

Subjecting the overload clutch to an additional load iteration based on the successful loading iteration count being less than the minimum iteration count.

Providing a test status indication based on the slip signal.

The test status indication is of a test fail based on receiving the slip signal at the processor, and the test status indication is of a test pass based on not receiving the slip signal at the processor.

The step of monitoring an overload clutch with a sensor, the sensor configured to sense slippage of a friction disc of the overload clutch and to generate a slip signal in response to slippage of the friction disc includes monitoring the overload clutch for a slip vibration profile, and generating the slip signal based on the sensor sensing the slip vibration profile.

The step of sensing a load on the cable and communicating the load to the processor includes routing the cable through a traction sheave disposed between the cable drum and a cable guide through which the cable exits the rescue hoist, and sensing the load generated on the traction sheave by the cable with a load cell disposed in the traction sheave.

The step of loading the cable to a minimum clutch slip load with the motor includes abutting a bumper disposed at a terminal end of the cable against a cable guide through which the cable exits the rescue hoist, and rotating the cable drum with the motor to cause the cable drum to reel in the cable with the bumper abutting the cable guide.

A method of initializing a hoist includes determining, with a processor of a computer, a status of at least one pre-test factor of a hoist, and conducting at field load check test of an overload clutch of the hoist based on each of the at least one pre-test factor being true, the field load check test including at least one loading iteration. The at least one loading iteration includes activating, with the processor of the computer, a motor of the hoist, the motor driving a cable drum through the overload clutch, loading the cable to a minimum clutch slip load with the motor, sensing a load on the cable and communicating the load to the processor, and monitoring an overload clutch with a sensor, the sensor configured to sense slippage of a friction disc of the overload clutch and to generate a slip signal in response to slippage of the friction disc.

The method of the preceding paragraph can optionally include, additionally and/or alternatively, any one or more of the following features, configurations and/or additional components:

The step of determining, with a processor of a computer, a status of at least one pre-test factor of a hoist includes recalling, from a memory of the computer, a state of the cable, the state indicating whether the cable is conditioned, and indicating a first pre-test factor is true based on the state indicating that the cable is conditioned.

The step of determining, with a processor of a computer, a status of at least one pre-test factor of a hoist includes comparing a time interval since most-recent test to a test interval, the test interval being a set time period between field load check tests of the overload clutch, and indicating a second pre-test factor as true based on a difference between the time interval since most-recent test and the test interval.

Indicating, with a user interface of the computer, that the first pre-test factor is false and that the cable requires conditioning based on the state of the cable indicating that the cable is not conditioned.

Generating a successful iteration count based on a number of times overload clutch does not slip in response to the cable being loaded to the minimum clutch slip load, and comparing the successful iteration count to a minimum iteration count.

Subjecting the overload clutch to an additional load iteration based on the successful loading iteration count being less than the minimum iteration count.

Providing a test status indication based on the slip signal.

The test status indication is of a test fail based on receiving the slip signal at the processor, and the test status indication is of a test pass based on not receiving the slip signal at the processor.

The step of monitoring the overload clutch with a sensor, the sensor configured to sense slippage of a friction disc of the overload clutch and to generate a slip signal in response to slippage of the friction disc includes monitoring the overload clutch for a slip vibration profile, and generating the slip signal based on the sensor sensing the slip vibration profile.

The step of sensing a load on the cable and communicating the load to the processor includes routing the cable through a traction sheave disposed between the cable drum and a cable guide through which the cable exits the rescue hoist, and sensing the load generated on the traction sheave by the cable with a load cell disposed in the traction sheave.

The step of loading the cable to a minimum clutch slip load with the motor includes abutting a bumper disposed at a terminal end of the cable against a cable guide through which the cable exits the rescue hoist, and rotating the cable drum with the motor to cause the cable drum to reel in the cable with the bumper abutting the cable guide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of testing an overload clutch, the method comprising:
   activating, with a processor of a computer, a motor of a hoist, the motor driving a cable drum through the overload clutch;
   loading the cable to a minimum clutch slip load with the motor;
   sensing a load on the cable and communicating the load to the processor; and
   monitoring the overload clutch with a sensor, the sensor configured to sense slippage of a friction disc of the overload clutch and to generate a slip signal in response to slippage of the friction disc.

2. The method of claim 1, further comprising:
   recalling, from a memory of the computer, a state of the cable, the state indicating whether the cable is conditioned.

3. The method of claim 1, further comprising:
   generating a successful iteration count based on a number of times overload clutch does not slip in response to the cable being loaded to the minimum clutch slip load; and
   comparing the successful iteration count to a minimum iteration count.

4. The method of claim 3, further comprising:
   subjecting the overload clutch to an additional load iteration based on the successful loading iteration count being less than the minimum iteration count.

5. The method of claim 4, further comprising:
   providing a test status indication based on the slip signal.

6. The method of claim 5, wherein:
   the test status indication is of a test fail based on receiving the slip signal at the processor; and
   the test status indication is of a test pass based on not receiving the slip signal at the processor.

7. The method of claim 1, wherein the step of monitoring the overload clutch with the sensor, the sensor configured to sense slippage of a friction disc of the overload clutch and to generate the slip signal in response to slippage of the friction disc comprises:
   monitoring the overload clutch for a slip vibration profile; and
   generating the slip signal based on the sensor sensing the slip vibration profile.

8. The method of claim 1, wherein the step of sensing the load on the cable and communicating the load to the processor comprises:
routing the cable through a traction sheave disposed between the cable drum and a cable guide through which the cable exits the rescue hoist; and
sensing the load generated on the traction sheave by the cable with a load cell disposed in the traction sheave.

9. The method of claim 1, wherein the step of loading the cable to the minimum clutch slip load with the motor further comprises:
abutting a bumper disposed at a terminal end of the cable against a cable guide through which the cable exits the rescue hoist; and
rotating the cable drum with the motor to cause the cable drum to reel in the cable with the bumper abutting the cable guide.

10. A method of initializing a hoist, the method comprising:
determining, with a processor of a computer, a status of at least one pre-test factor of a hoist;
conducting at field load check test of an overload clutch of the hoist based on each of the at least one pre-test factor being true, the field load check test comprising at least one loading iteration comprising:
activating, with the processor of the computer, a motor of the hoist, the motor driving a cable drum through the overload clutch;
loading the cable to a minimum clutch slip load with the motor;
sensing a load on the cable and communicating the load to the processor; and
monitoring the overload clutch with a sensor, the sensor configured to sense slippage of a friction disc of the overload clutch and to generate a slip signal in response to slippage of the friction disc.

11. The method of claim 10, wherein the step of determining, with the processor of the computer, the status of at least one pre-test factor of a hoist comprises:
recalling, from a memory of the computer, a state of the cable, the state indicating whether the cable is conditioned; and
indicating a first pre-test factor is true based on the state indicating that the cable is conditioned.

12. The method of claim 11, wherein the step of determining, with the processor of the computer, the status of at least one pre-test factor of a hoist further comprises:
comparing a time interval since most-recent test to a test interval, the test interval being a set time period between field load check tests of the overload clutch; and
indicating a second pre-test factor as true based on a difference between the time interval since most-recent test and the test interval.

13. The method of claim 11, further comprising:
indicating, with a user interface of the computer, that the first pre-test factor is false and that the cable requires conditioning based on the state of the cable indicating that the cable is not conditioned.

14. The method of claim 10, further comprising:
generating a successful iteration count based on the number of loading iterations where overload clutch does not slip in response to the cable being loaded to the minimum clutch slip load; and
comparing the successful iteration count to a minimum iteration count.

15. The method of claim 14, further comprising:
subjecting the overload clutch to an additional load iteration based on the successful loading iteration count being less than the minimum iteration count.

16. The method of claim 15, further comprising:
providing a test status indication based on the slip signal.

17. The method of claim 16, wherein:
the test status indication is of a test fail based on receiving the slip signal at the processor; and
the test status indication is of a test pass based on not receiving the slip signal at the processor.

18. The method of claim 10, wherein the step of monitoring the overload clutch with the sensor, the sensor configured to sense slippage of the friction disc of the overload clutch and to generate the slip signal in response to slippage of the friction disc comprises:
monitoring the overload clutch for a slip vibration profile; and
generating the slip signal based on the sensor sensing the slip vibration profile.

19. The method of claim 10, wherein the step of sensing the load on the cable and communicating the load to the processor comprises:
routing the cable through a traction sheave disposed between the cable drum and a cable guide through which the cable exits the rescue hoist; and
sensing the load generated on the traction sheave by the cable with a load cell disposed in the traction sheave.

20. The method of claim 10, wherein the step of loading the cable to the minimum clutch slip load with the motor further comprises:
abutting a bumper disposed at a terminal end of the cable against a cable guide through which the cable exits the rescue hoist; and
rotating the cable drum with the motor to cause the cable drum to reel in the cable with the bumper abutting the cable guide.

* * * * *